United States Patent [19]

Harms

[11] Patent Number: 4,887,707
[45] Date of Patent: Dec. 19, 1989

[54] INTERLOCKING TORQUE TUBE-PULLEY ASSEMBLY FOR LIVE ROLLER LINE SHAFT CONVEYORS

[75] Inventor: Jeffrey Harms, Spring Lake, Mich.

[73] Assignee: Ermanco Incorporated, Spring Lake, Mich.

[21] Appl. No.: 206,087

[22] Filed: Jun. 13, 1988

[51] Int. Cl.⁴ .............................................. B65G 13/06
[52] U.S. Cl. ..................................... 198/781; 198/790
[58] Field of Search ............................... 198/781, 790

[56] References Cited

U.S. PATENT DOCUMENTS

| | | |
|---|---|---|
| 3,610,404 | 10/1971 | Fleischauer et al. |
| 3,621,982 | 11/1971 | Fleischauer et al. |
| 3,650,375 | 3/1972 | Fleischauer et al. ............... 198/781 |
| 3,696,912 | 10/1972 | Fleischauer et al. ............... 198/781 |
| 3,753,485 | 8/1973 | Fromme et al. |
| 3,840,110 | 10/1974 | Molt et al. |
| 3,902,589 | 9/1975 | Bylsma |
| 3,961,700 | 6/1976 | Fleischauer |
| 4,013,161 | 3/1977 | Nelson |
| 4,164,998 | 8/1979 | DeGood et al. |
| 4,185,735 | 1/1980 | Hammond |
| 4,193,492 | 3/1980 | Hammond |
| 4,196,312 | 4/1980 | DeGood et al. |
| 4,198,833 | 4/1980 | Fleischauer et al. |
| 4,264,002 | 4/1981 | Van Der Schie |
| 4,355,715 | 10/1982 | Chorlton |
| 4,372,442 | 2/1983 | Fleischauer |
| 4,583,637 | 4/1986 | Ferguson |
| 4,588,073 | 5/1986 | Abell |

FOREIGN PATENT DOCUMENTS

| | | |
|---|---|---|
| 3532727 | 10/1986 | Fed. Rep. of Germany ...... 198/781 |
| 0149906 | 11/1981 | Japan .................................. 198/781 |
| 0067404 | 4/1982 | Japan .................................. 198/790 |
| 1401593 | 7/1975 | United Kingdom ................ 198/790 |

Primary Examiner—David A. Bucci
Assistant Examiner—James R. Bidwell
Attorney, Agent, or Firm—Lockwood, Alex, Fitzgibbon & Cummings

[57] ABSTRACT

An interlocking torque tube-pulley assembly as provided for live roller, line shaft conveyor systems. The assembly is actually disposed along a rotating drive shaft and generally includes a number of drive pulleys with spacer members interposed therebetween. The drive pulleys and the spacer members snap together by an overlap of materials with a locking feature. When interlocked, the pulley and spacer members are connected to the conveyor rollers of the conveyor system by endless drive belts. In this manner, an accumulation zone of conveyor rollers is formed wherein a "positive drive" is provided by the disclosed torque tube-pulley assembly. In an alternate embodiment, the spacer members are provided in a segmented form wherein two spacer half members are adhesively joined by a collar portion. In this second embodiment, the distance between the pulley members on the assembly may be varied to accomodate the spacing between the conveyor rollers of the conveyor system.

36 Claims, 2 Drawing Sheets

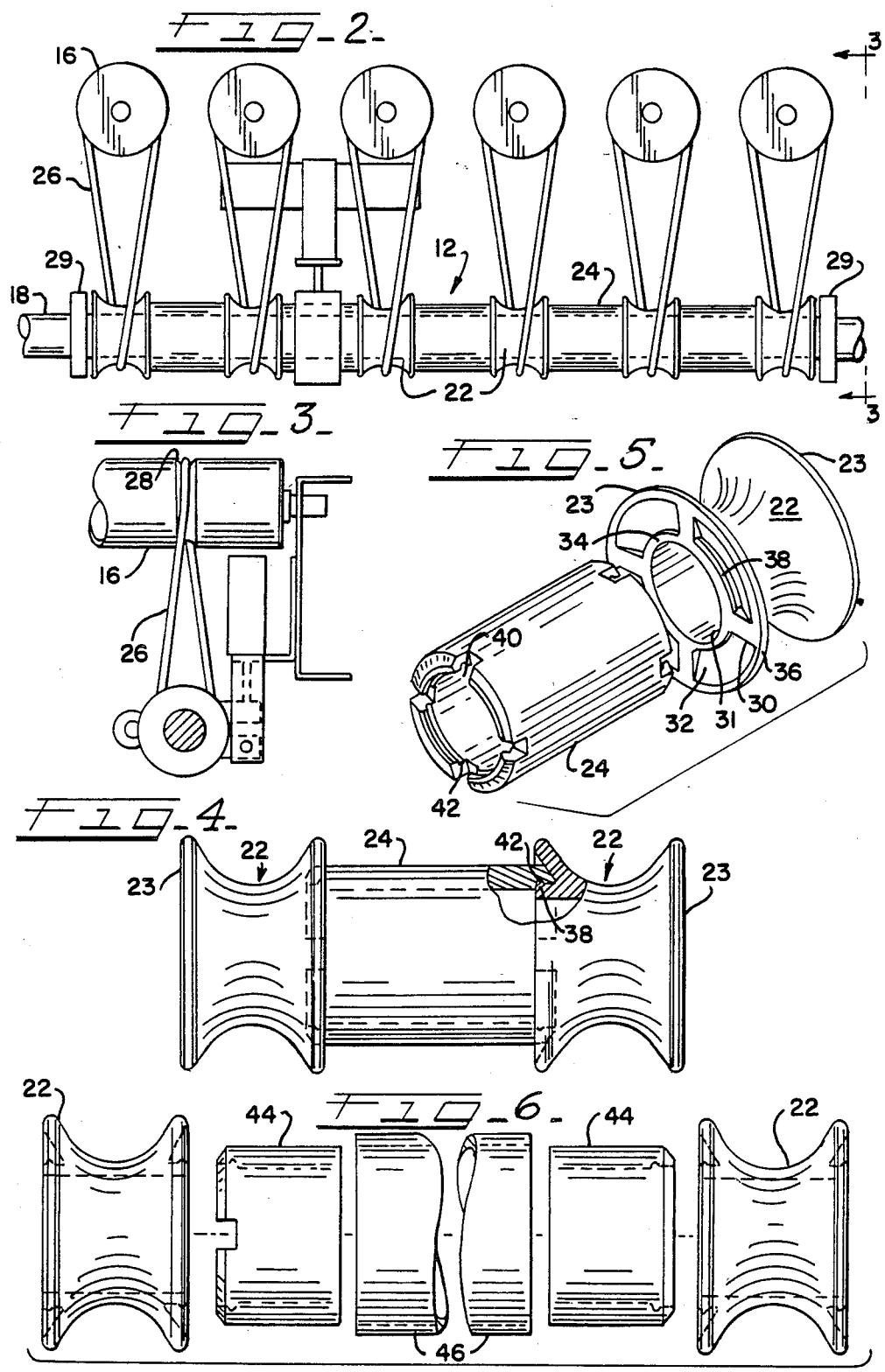

INTERLOCKING TORQUE TUBE-PULLEY ASSEMBLY FOR LIVE ROLLER LINE SHAFT CONVEYORS

BACKGROUND AND DESCRIPTION OF THE INVENTION

The present invention relates to live roller conveyor systems for transporting articles along a predetermined path. More specifically, this invention relates to live roller, line shaft conveyor systems which utilize the frictional coupling between a drive shaft and at least one torque tube-pulley assembly to provide power to a series of conveyor rollers.

Live roller conveyor systems are well known in the art. In general, these systems include a series of driven rollers which lie within a common plane. The driven rollers form a pass line along which articles are conveyed. Prior art conveyor systems have employed various means for driving the conveyor rollers in order to convey the articles to a collection or accumulation location. Typically, a live roller conveyor system includes a rotatable drive shaft and means for transferring power from the rotating shaft to the conveyor rollers. The rotating conveyor rollers convey the articles along the pass line until they have reached an accumulation location where the rollers are stopped to allow for the accumulation of the articles.

One such prior art conveyor system is described in U.S. Pat. No. 3,696,912 (Fleischauer et al.), the disclosure of which is incorporated by reference herein. In general, the '912 patent describes a conveyor system which includes individually powered transverse rollers disposed within a common plane defining a pass line along which the conveyed articles are propelled. In one embodiment, a plurality of end-to-end elongate sleeves are positioned along the length of the drive shaft. Each elongate sleeve carries a plurality of drive pulleys which transfer power from the drive shaft to the associated rollers through resilient tensioned drive belts. The drive belts pull the pulleys and the sleeves upward thereby providing frictional coupling between the pulleys, the sleeves, and the drive shaft. This frictional coupling is generally sufficient to provide power transmission from the drive shaft to each roller. The use of elongate sleeves allows groups of rollers to be braked simultaneously by halting the rotation of the sleeve while the drive shaft continues to rotate. In another embodiment of the '912 patent, spool shaped depressions are provided directly within the outer surface of each elongate sleeve.

The various embodiments disclosed in the '912 patent are generally suitable for transmitting power to the individual rollers. However, the embodiments of the aforementioned patent have several disadvantages. The use of unitary elongate sleeves is generally disadvantageous since the sleeves are manufactured in predetermined uniform lengths thereby inhibiting flexibility of design in those instances where sleeves of nonuniform lengths would be desirable. Additionally, while the system is operating, the entire length of each elongate sleeve is in constant frictional contact with the drive shaft. This frictional contact results in significant heat generation which can shorten the useful life of the sleeves.

Another prior art system is shown in U.S. Pat. No. 3,621,982 (Fleischauer et al.), the disclosure of which is incorporated by reference herein. The '982 patent generally describes a conveyor roller system wherein each conveyor roller is individually powered. In one embodiment, a plurality of pulleys are individually disposed along the length of the drive shaft with spacer members loosely interposed between each pulley pair. As in the aforementioned '912 patent, an elastomeric drive belt connects each pulley to an individual conveyor roller. The belt pulls the pulley to one side of the drive shaft to provide frictional coupling between the drive shaft and the pulley for a non-slipping transmission of power from the drive shaft to each conveyor roller.

The use of individual pulleys, loosely disposed along a drive shaft, generally requires fairly elaborate braking means to brake a group of rollers simultaneously. Additionally, the drive for the individual pulley/conveyor roller pairs does not contribute to the drive for any of the other pulley/roller pairs in the system. Such a contribution, referred to as "positive drive", is desired as an aid in loading heavier articles onto the pass line.

Similarly, U.S. Pat. No. 3,650,375 (Fleischauer et al.) generally discloses drive pulleys individually disposed along a drive shaft with spacers interposed therebetween. The disclosure of the '375 patent is incorporated by reference herein. In the embodiments of the '375 patent, the means for driving the conveyor rollers does not include a "positive drive."

The present invention overcomes the aforementioned problems of the prior art systems. Specifically, an interlocking torque tube-pulley assembly is provided for live roller, line shaft conveyor systems. The assembly is axially disposed along a rotating drive shaft and includes a number of drive pulleys with spacer members interposed therebetween. The drive pulleys and spacer members snap together by an overlap of materials with a locking feature. With the pulley and spacer members snapped together, an "accumulation zone" of conveyor rollers is formed. Within this zone, conveyor rollers are simultaneously driven by endless drive belts which connect each of the pulleys to individual conveyor rollers. In this arrangement of parts, the drive belts maintain the pulleys, which are part of the assembly, in frictional contact with the drive shaft to provide the necessary transmission of power from the drive shaft to the conveyor rollers.

The interlocking design of the present invention provides a "positive drive" within each accumulation zone which is valuable in situations, for example, when an object to be conveyed is first entering the conveyor line. In such instances, the additional drive provided by the other pulley/roller pairs enables heavier packages to be pulled onto the pass line by the first one or so rollers in the accumulation zone. Additionally, zone lengths can be varied according to the requirements of a specific job without the need to manufacture and store unitary assemblies of various lengths. In an alternate embodiment, variations in the spacing between the conveyor rollers can be accommodated by providing segmented spacer members with collars whereby the distance between the pulleys can be varied by use of a collar to join two spacer half portions.

The components of the present invention can be manufactured out of steel or a suitable non-ferrous metal, or a heat resistant synthetic material. In general, steel, or another metallic material, is more efficient in dissipating the heat which is generated by the friction between the drive shaft and the assembly. In general this heat tends to shorten the useful life of the drive pulleys. Assemblies manufactured from steel or a non-ferrous metal generally have longer useful lives than assemblies made from synthetic materials.

The problem of heat dissipation with synthetic components can be minimized in several ways. Spacer members may be made so that, when connected to a pulley pair, the spacers do not contact the rotating drive shaft. In this manner, frictional contact between the drive shaft and the spacer members can be avoided. Furthermore, the placement of drill holes in the spacer members will allow heat to dissipate therethrough. When synthetic materials are used, the choice of material can also have an affect on the longevity of the assembly. Various known heat-resistant synthetic materials are satisfactory for the manufacture of the assembly components. In particular, the use of an acetal resin, such as the acetal resin known under the trade name "Delrin", is quite satisfactory for producing a thermally stable assembly. The use of nylons, however, has been generally unsatisfactory in overcoming the effects of heat generation on the component pieces of the assembly.

The interlocking assembly is provided with an overlap of parts. A snap/lock feature is provided to releasably secure the component pieces of the assembly to each other to provide for "positive drive", and the like. The assembly of the present invention allows for the simultaneous braking of all conveyor rollers within an accumulation zone by simply applying sufficient braking force to one of the spacer members, for example, to stop the assembly from rotating. Braking is generally accomplished in a manner well known to the art, such as by using a clamp type brake which is either pneumatically or electrically activated.

Accordingly, it is an object of the present invention to provide a live roller, line shaft conveyor system wherein an interlocking torque tube-pulley assembly is utilized.

It is another object of the present invention to provide an interlocking torque tube-pulley assembly for live roller, line shaft conveyors wherein pulleys are positioned along the length of a drive shaft with a spacer member interposed between and connected to at least one of the pulleys.

It is still another object of the present invention to provide a live roller, line shaft conveyor system including an interlocking torque tube-pulley assembly positioned along the drive shaft of the system wherein an accumulation zone can be braked by applying braking pressure along the length of the assembly, preferably along one or more of the spacer members.

BRIEF DESCRIPTION OF THE DRAWINGS

FIG. 2 is an elevation, partially in section, of a conveyor system with an interlocking torque tube-pulley assembly according to the present invention;

FIG. 3 is a partial side elevation taken along the 3—3 line of FIG. 2;

FIG. 4 is an enlarged view, partially in section, of a segment of an interlocking torque tube-pulley assembly and showing the snap/lock feature according to the present invention;

FIG. 5 is an exploded sectional view of a pulley member and a spacer member of the assembly of Figure 4;

FIG. 6 is an exploded sectional view of an alternate embodiment of the assembly of FIG. 5.

DETAILED DESCRIPTION OF THE INVENTION

Figure 1:
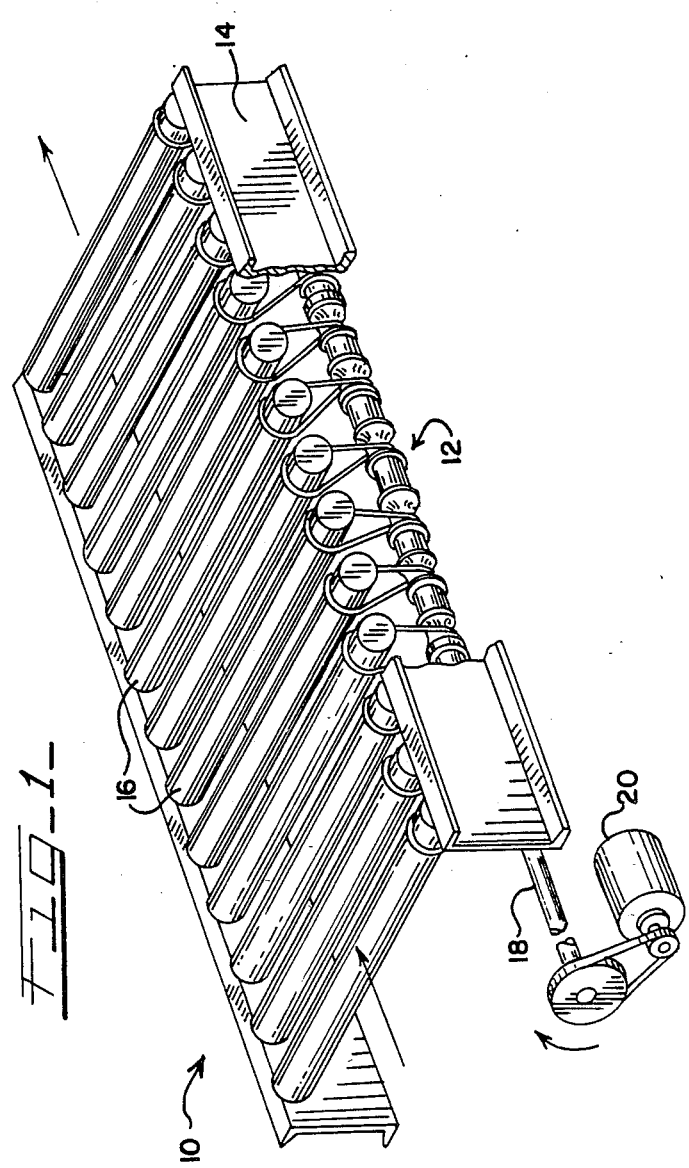
FIG. 1 is a perspective view of a conveyor system utilizing an interlocking torque tube-pulley assembly according to the present invention.

Referring now to FIGS. 1 and 2, illustration is made of a live roller, line shaft conveyor system 10 utilizing an interlocking torque tube-pulley assembly 12 according to the present invention. The conveyor system 10 generally includes a frame with at least two parallel frame members 14 and a series of conveyor rollers 16 extending between and axially connected to each of the parallel frame members 14. A drive shaft 18 is provided which generally extends transversely beneath the conveyor rollers 16 and in a proximate spacial relationship to one of the frame members 14. Motor 20 supplies power for rotation of the drive shaft 18 (shown in FIG. 1 as clockwise rotation).

The assembly 12 is axially disposed along the drive shaft 18. In the embodiment illustrated in FIG. 2, the assembly 12 includes a series of drive pulleys 22 which rest on and directly contact the drive shaft 18. Each pulley 22 includes flange portions 23 and a bore hole 31 (shown in FIG. 5) which spans the distance between flanges 23. The bore 31 slidably receives the drive shaft 18. In general, individual tubular spacer members 24 are interposed between and releasably connected to each pair of drive pulleys 22.

In some applications, the drive shaft 18 may be turned a relatively sharp angles at various points along the length thereof (not shown). When such a turn is required, the shaft 18 may consist of several smaller, elongate portions which are longitudinally connected to each other by U-joints, or the like. In this manner, the use of such smaller elongate portions allows the shaft 18 to turn as a unitary structure. To accommodate the use of such small elongate portions, the interlocking assembly 12 may include only a single pulley 22 connected to a single spacer 24 disposed along each of the smaller portions of the shaft 18.

In the present embodiment, the spacer members 24 are provided with an internal diameter which is greater than the diameter of the bore 31 in drive pulley 22. When the pulleys 22 and the spacer members 24 are connected, as shown in FIG. 2, the spacer members 24 never contact the drive shaft 18. As mentioned above, heat generated during operation of the system 10, and resulting from the friction between the drive shaft 18 and the pulleys 22, is minimized since the spacer members 24 are not in frictional contact with the shaft 18. The internal diameter of the spacer member 24 becomes especially important when the component parts of the assembly 12 are manufactured with a plastic material. The heat generated during operation can significantly reduce the useful life of the assembly 12. Therefore, the reduction of heat can increase the useful life of the assembly 12. Additionally, the placement of drill holes (not shown) in the spacer members can aid in heat dissipation.

As shown in FIG. 3, each conveyor roller 16 is provided with a groove 28 for receiving a resilient tensioned drive belt 26. In operation, the pulleys 22 are positioned directly underneath conveyor rollers 16 and are connected thereto by the drive belts 26. As shown in FIG. 2, the spacing between the pulleys 22 should correspond to the spacing between the conveyor rollers 16. The tension supplied by the drive belts 26 maintain frictional contact between the assembly 12 and the drive shaft 18 along the inner surface of the bore hole 31. Rotation of the shaft 18 causes concurrent rotation of the assembly 12 through the frictional coupling of the shaft 18 with the pulleys 22. In this manner, power is transmitted from the drive shaft 18 to the rollers 16 through the endless drive belts 26. Rotation of rollers 16 propels the various articles to be conveyed (not shown) along the pass line created by the rollers 16 (indicated by the arrows in FIG. 1).

As a result of the rotation of the drive shaft 18 and the tension supplied by the belts 26, the assembly 12 will tend to shift its position along its longitudinal axis and move further down the drive shaft 18. In the embodiment illustrated, such axial shift is prevented by providing a "captured" assembly whereby bearings or stops 29 are mounted on the drive shaft to stop the assembly 12 from moving from a preferred position in which the pulleys 22 are aligned directly beneath the rollers 16. In the absence of stops 29, or their equivalent, the assembly will operate properly in an "uncaptured" mode and the snap/lock feature will hold the assembly 12 together while the pulleys 22 undergo such axial shift.

Referring now to FIGS. 4 and 5, illustration is made of the structural relationship between the drive pulleys 22 and the spacer members 24. In general, a pair of pulleys 22 is reversibly connected by a single spacer member 24 through an overlap of parts. However, as mentioned above, some applications may require a single pulley 22 connected to a single spacer member 24. In the embodiment illustrated, the side faces of the flanges 23 are identically provided with a plurality of ribs 30 extending radially from the annular lip 34 and up to the annular rim 36. Recessed areas 32 are provided between the ribs 30 with tongue portions 38 provided along the surface of the annular lip 34 and just within the recessed areas 32.

Spacer member 24 is compatibly manufactured with slots 40 and annular grooves 42. In this manner, slots 40 matingly receive ribs 30. As mentioned, the internal diameter of the spacer member 24 is generally manufactured to be larger than the diameter of the bore 31 to allow the spacer member 24 to slide over the annular lip 34 and into the recessed portions 32 of the flange 23. A snap/lock feature is provided wherein the tongue 38 of flange 23 is securely received in the groove 42 of spacer member 24. Accordingly, spacer members 24 and pulleys 22 are secured to one another in an interlocked assembly, as illustrated in FIG. 4. Alternatively, it is possible to provide an assembly in which the rib portions are located on the spacer member and the groove portions are located in the pulley. Various other equivalent means (not shown) are available for releasably attaching the spacer members 24 to the pulleys 22. It is not intended that the present invention be limited to the particular snap/lock feature described above.

Referring to FIG. 6, an alternate embodiment of the assembly 12 is illustrated. In certain applications,, it may be desirable to provide a conveyor system in which the spacing between the conveyor rollers 16 varies from the spacings used in other applications. In such instances, the spacer members 24 can include identical halves 44 and a collar 46. Each of the halves 44 may attach to one of the pulley members 22 using the snap/lock feature described above, or its equivalent. In this embodiment, two spacer halves 44 may be interposed between each pair of drive pulleys 22 with a collar member 46 slidably receiving the unattached end of each half 44. In this manner, the pulleys 22 may be spaced along the assembly 10 so that when the assembly is positioned along the drive shaft, the spacing between the pulleys 22 will correspond to the spacing between the conveyor rollers 16. The collar portion 46 allows for adjustability of the pulley-to-pulley spacing by slidably receiving the spacer halves 44 so that each spacer half 44 may be adjustably positioned relative to both the collar 46 and the other spacer half 44. Once adjustment of the pulley position is complete, the collar 46 may be adhesively secured to each of the pulley halves 44. The spacer halves 44 of FIG. 6 may be manufactured of a uniform length while the collar portions 46 may be made according to one or more lengths to accommodate the contemplated changes in the conveyor roller spacings as known by those skilled in the art.

Regarding materials, a principle consideration in the manufacture of component parts for the interlocking assembly is the ability of the material or materials to efficiently dissipate the heat generated by the frictional contact between the assembly and the drive shaft during use. In this regard, steel or non-ferrous metals are preferred over synthetic materials. However, since manufacturing costs are generally substantially less for synthetic materials, the problem of heat dissipation may be alleviated, in part, by the placement of drill holes (not shown) in the spacer members. The use of thermally stable synthetic materials will prolong the useful life of component parts while allowing for more economic manufacturing thereof. A particularly suitable synthetic material is an acetal resin such as that commonly known under the trade name "Delrin." Other synthetic materials, particularly nylons, may not possess the needed thermal stability. Assemblies manufactured with thermally inferior materials will require a replacement of parts more frequently than when suitable metallic or thermally stable synthetic materials are employed.

It will be understood that the described embodiments are merely illustrations of a few of the applications of the principles of the present invention. Numerous modifications may be made by those skilled in the art without departing from the true spirit and scope of the invention as defined in the following claims.

What is claimed:

1. A live roller, line shaft conveyor system, comprising:
   a series of two or more conveyor rollers, each of said rollers extending between and axially connected to each of a pair of parallel frame members, each said conveyor roller including a recessed portion for receiving an endless drive belt;
   a drive shaft extending transversely beneath said conveyor rollers;
   at least one interlocked assembly, said assembly including at least one pulley member axially disposed along said drive shaft, said pulley member having a pair of flanges, each said flange having recessed portions therein, and at least one tubular spacer member, said one spacer member being releasably held within said recessed portions in one of said flanges in a snap/lock arrangement;
   a plurality of endless drive belts, each said belt looped around one of said pulley members and one of said conveyor rollers and within said recessed portion of said conveyor roller; and
   whereby said drive belts maintain said interlocked assembly in frictional contact with said drive shaft for transmitting power from said drive shaft to each of said conveyor rollers when said drive shaft is rotating.

2. The conveyor system of claim 1, wherein said at least one pulley member further includes:
   a bore hole for receiving said drive shaft therethrough, said bore hole traversing the distance between said flange portions;
   annular lip portions defining each end of said bore hole;
   rib portions extending radially from each said annular lip portion, said recessed portions provided between said rib portions and within each said flange portion; and
   a tongue portion provided along the surface of each said annular lip and within each said recessed portion.

3. The conveyor system of claim 2, wherein each of said tubular spacer member includes:
   slots for matingly receiving said rib portions of said pulley members;
   an annular groove within the inner surface of each end of said spacer member, each said groove extending between said slots and dimensioned to securely receive said tongue portion of said pulley members; and
   each said end of said spacer member being dimensioned to overlap one of said annular lips of one of said pulley members for releasably securing said spacer to said pulley in said snap/lock arrangement.

4. The conveyor system of claim 2, wherein each said tubular spacer member includes:
   two identical half portions;
   slots located at one end of each of said half portions, said slots matingly receiving said rib portions;
   annular grooves within the inner surface of said end of each of said half portions, each said groove extending between said slots and formed to securely receive said tongue portion of said pulley member;
   a collar portion slidably receiving the unslotted ends of each of said half portions; and
   each said slotted end of each said half portion being dimensioned to overlap an annular lip of one of said pulleys for releasably securing said spacer to said pulley.

5. The spacer member of claim 4, wherein said collar portion is adhesively affixed to each of said half portions.

6. The conveyor system of claim 1, wherein the spacing between said pulley members is substantially the same as the spacing between said conveyor rollers.

7. The conveyor system of claim 1, wherein said drive shaft includes means for stopping said interlocked assembly from axially shifting along said drive shaft while said drive shaft is rotating.

8. The conveyor system of claim 1, wherein said interlocked assembly is made from steel.

9. The conveyor system of claim 1, wherein said interlocked assembly is made from a non-ferrous metal.

10. The conveyor system of claim 1, wherein said interlocked assembly is made from an acetal resin material.

11. In a live roller, line shaft conveyor system including a series of two or more conveyor rollers, each roller containing a recessed or pulley portion and extending between and axially connected to a pair of parallel frame members, a drive shaft extending transversely beneath the conveyor rollers, at least one interlocked assembly disposed along the drive shaft, a plurality of endless drive belts connecting the conveyor rollers with the interlocked assembly, said interlocked assembly comprising:
   at least one pulley member axially disposed along the drive shaft, said pulley member having a pair of flanges for receiving a drive belt therebetween, each said flange having a recessed portion;
   at least one tubular spacer member releasably fitted within one of said recessed portions in a snap/lock arrangement; and,
   whereby, the endless drive belts maintain the interlocked assembly in frictional contact with the drive shaft for transmitting power from the drive shaft to each of the conveyor rollers when the drive shaft is rotating.

12. The assembly of claim 11, wherein said pulley members further include:
   a bore hole for receiving said drive shaft therethrough, said bore hole traversing the distance between said flange portions;
   annular lip portions defining each end of said bore hole;
   rib portions extending radially from each said annular lip portion, said recessed portions provided between said rib portions and within each said flange portion; and
   a tongue portion provided along the surface of each said annular lip and within said recessed portion.

13. The assembly of claim 12, wherein each end of said tubular spacer member includes:
   slots for matingly receiving said rib portions of said pulley members;
   an annular groove within the inner surface of each end of said spacer member, each said groove extending between said slots and dimensioned to securely receive said tongue portion of said pulley members; and
   each said end of said spacer member being dimensioned to overlap one of said annular lips of one of said pulleys for releasably securing said spacer to said pulley in said snap/lock arrangement.

14. The assembly of claim 12, wherein each said tubular spacer member includes:
   two identical half portions;
   slots located at one end of each of said half portions, said slots matingly receiving said rib portions;
   annular grooves within the inner surface of said end of each of said half portions, each said groove extending between said slots and formed to securely receive said tongue portion of said pulley member;
   a collar portion slidably receiving the unslotted ends of each of said half portions; and
   each said slotted end of each said half portion being dimensioned to overlap an annular lip of on of said pulleys for releasably securing said spacer to said pulley.

15. The assembly of claim 14, wherein said collar portion is adhesively affixed to each of said half portions.

16. The assembly of claim 11, wherein the spacing between said pulley members is substantially the same as the spacing between the conveyor rollers.

17. The assembly of claim 11, wherein the drive shaft includes means for stopping said interlocked assembly from axially shifting along the drive shaft while the drive shaft is rotating.

18. The assembly of claim 11, wherein said interlocked assembly is made from steel.

19. The assembly of claim 11, wherein said interlocked assembly is made from an acetal resin material.

20. The assembly of claim 11, wherein said interlocked assembly is made from a non-ferrous metal.

21. A live roller, line shaft conveyor system, comprising:
- a series of two or more conveyor rollers, each of said rollers extending between and axially connected to each of a pair of parallel frame members, each said conveyor roller including a recessed portion for receiving an endless drive belt;
- a drive shaft extending transversely beneath said conveyor rollers;
- at least one interlocked assembly, said assembly including at least one pulley member axially disposed along said drive shaft, and at least one tubular spacer member, said one spacer member being releasably connected to said pulley member;
- said pulley member including two laterally disposed flange portions, a bore hole for receiving said drive shaft therethrough, said bore hole traversing the distance between said flange portions, annular lip portions defining each end of said bore hole, rib portions extending radially from each said annular lip portion and within each said flange portion, recessed portions provided between said rib portions and within each said flange portion, and a tongue portion provided along the surface of each said annular lip and within said recessed portion;
- said spacer member including slots for matingly receiving said rib portions of said pulley members, an annular groove within the inner surface of said spacer member, said groove extending between said slots and dimensioned to securely receive said tongue portion of said pulley member, each said spacer member being dimensioned to overlap one of said annular lips of said pulley member for releasably securing said spacer member to said pulley member;
- a plurality of endless drive belts, each said belt looped around said pulley member and one of said conveyor rollers and within said recessed portion of said conveyor roller; and
- whereby said drive belts maintain said interlocked assembly in frictional contact with said drive shaft for transmitting power from said drive shaft to each of said conveyor rollers when said drive shaft is rotating.

22. The conveyor system of claim 21, wherein each said tubular spacer member includes two identical half portions, one end of each said half portion having said slots and said annular grooves thereon, said half portions being connected to each other with a collar portion, said collar portion slidably receiving the unslotted ends of each of said half portions.

23. The spacer member of claim 22, wherein said collar portion is adhesively affixed to each of said half portions.

24. The conveyor system of claim 21, wherein the spacing between said pulley members is substantially the same as the spacing between said conveyor rollers.

25. The conveyor system of claim 21, wherein said drive shaft includes means for stopping said interlocked assembly from axially shifting along said drive shaft while said drive shaft is rotating.

26. The conveyor system of claim 21, wherein said interlocked assembly is made from steel.

27. The conveyor system of claim 21, wherein said interlocked assembly is made from a non-ferrous metal.

28. The conveyor system of claim 21, wherein said interlocked assembly is made from an acetal resin material.

29. In a live roller, line shaft conveyor system including a series of two or more conveyor rollers, each roller containing a recessed or pulley portion and extending between and axially connected to a pair of parallel frame members, a drive shaft extending transversely beneath the conveyor rollers, at least one interlocked assembly disposed along the drive shaft, a plurality of endless drive belts connecting the conveyor rollers with the interlocked assembly, said interlocked assembly comprising:
- at least one pulley member axially disposed along the drive shaft, said pulley member having two laterally disposed flange portions for receiving a drive belt therebetween, a bore hole for receiving said drive shaft therethrough, said bore hole traversing the distance between said flange portions, annular lip portions defining each end of said bore hole, rib portions extending radially from each said annular lip portion and within each said flange portion, recessed portions provided between said rib portions and within each said flange portion, and a tongue portion provided along the surface of each said annular lip and within said recessed portion;
- at least one tubular spacer member releasably connected to said pulley member, said spacer member including slots for matingly receiving said rib portions of said pulley member, an annular groove within the inner surface of said spacer member, said groove extending between said slots and dimensioned to securely receive said tongue portion of said pulley member, each said spacer member being dimensioned to overlap one of said annular lips of said pulley member for releasably securing said spacer member to said pulley member; and
- whereby, the endless drive belts maintain the interlocked assembly in frictional contact with the drive shaft for transmitting power from the drive shaft to each of the conveyor rollers when the drive shaft is rotating.

30. The assembly of claim 29, wherein each said tubular spacer member includes two identical half portions, one end of each said half portion having said slots and said grooves thereon, said half portions being connected to each other with a collar portion, said collar portion slidably receiving the unslotted ends of each of said half portions.

31. The assembly of claim 30, wherein said collar portion is adhesively affixed to each of said half portions.

32. The assembly of claim 29, wherein the spacing between said pulley members is substantially the same as the spacing between the conveyor rollers.

33. The assembly of claim 29, wherein the drive shaft includes means for stopping said interlocked assembly from axially shifting along the drive shaft while the drive shaft is rotating.

34. The assembly of claim 29, wherein said interlocked assembly is made from steel.

35. The assembly of claim 29, wherein said interlocked assembly is made from an acetal resin material.

36. The assembly of claim 29, wherein said interlocked assembly is made from a non-ferrous metal.

* * * * *